US011994919B2

United States Patent
Grobelny et al.

(10) Patent No.: US 11,994,919 B2
(45) Date of Patent: May 28, 2024

(54) LOCK FOR A PORTABLE INFORMATION HANDLING SYSTEM

(71) Applicant: Dell Products L.P., Round Rock, TX (US)

(72) Inventors: Nicholas D. Grobelny, Austin, TX (US); Jason S. Morrison, Chadron, NE (US); Patrick A. Hampton, Round Rock, TX (US); Michael David, Austin, TX (US); Ernesto Ramirez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 424 days.

(21) Appl. No.: 17/359,971

(22) Filed: Jun. 28, 2021

(65) Prior Publication Data

US 2022/0413560 A1 Dec. 29, 2022

(51) Int. Cl.
*G06F 1/16* (2006.01)
*F16B 21/12* (2006.01)
*G06F 21/86* (2013.01)

(52) U.S. Cl.
CPC ............ *G06F 1/1679* (2013.01); *F16B 21/12* (2013.01); *G06F 21/86* (2013.01)

(58) Field of Classification Search
CPC ........ G06F 21/86; G06F 21/88; G06F 1/1679; F16B 21/12
See application file for complete search history.

(56) References Cited

U.S. PATENT DOCUMENTS

| | | | | |
|---|---|---|---|---|
| 5,257,007 A * | 10/1993 | Steil | ....................... | G08B 25/10 340/539.3 |
| 6,222,727 B1 * | 4/2001 | Wu | ...................... | G11B 33/124 361/679.48 |
| 7,997,631 B2 * | 8/2011 | Chen | ........................ | E05C 3/30 361/679.57 |
| 8,385,060 B2 * | 2/2013 | Dabov | .................... | G06F 1/169 361/679.55 |
| 8,542,495 B1 * | 9/2013 | Gorman | ................ | G06F 1/1656 361/752 |
| 10,022,506 B2 * | 7/2018 | Pribitkin | ........... | A61M 5/31501 |
| 10,029,499 B2 * | 7/2018 | Koshigoe | ................... | B41J 3/36 |
| 10,713,347 B2 * | 7/2020 | Talwerdi | ................. | G06F 21/86 |
| 10,931,026 B2 * | 2/2021 | Scheucher | ......... | H04B 7/15557 |

* cited by examiner

*Primary Examiner* — Hosuk Song
(74) *Attorney, Agent, or Firm* — Terrile, Cannatti & Chambers, LLP; Stephen A. Terrile

(57) ABSTRACT

A main housing portion of a portable information handing system. The main housing portion includes: a top cover portion; a bottom cover portion; and, an information handling system locking system, the information handling system locking system including a bottom cover locking component, the bottom cover locking component being mounted to the bottom cover, the bottom cover locking component defining a bottom cover locking portion aperture, the bottom cover locking portion aperture being aligned with the top cover aperture.

6 Claims, 16 Drawing Sheets

LOCK FOR A PORTABLE INFORMATION HANDLING SYSTEM

BACKGROUND OF THE INVENTION

Field of the Invention

The present invention relates to information handling systems. More specifically, embodiments of the invention relate to a lock for use with a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a main housing portion of a portable information handing system, comprising: a top cover portion; a bottom cover portion; and, an information handling system locking system, the information handling system locking system including a bottom cover locking component, the bottom cover locking component being mounted to the bottom cover, the bottom cover locking component defining a bottom cover locking portion aperture, the bottom cover locking portion aperture being aligned with the top cover aperture.

In another embodiment the invention relates to an information handling system comprising: a processor; a data bus coupled to the processor; and an information handling system chassis housing, the housing comprising a base chassis, the base chassis housing the processor, the base chassis comprising a top cover portion; a bottom cover portion; and, an information handling system locking system, the information handling system locking system including a bottom cover locking component, the bottom cover locking component being mounted to the bottom cover, the bottom cover locking component defining a bottom cover locking portion aperture, the bottom cover locking portion aperture being aligned with the top cover aperture.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
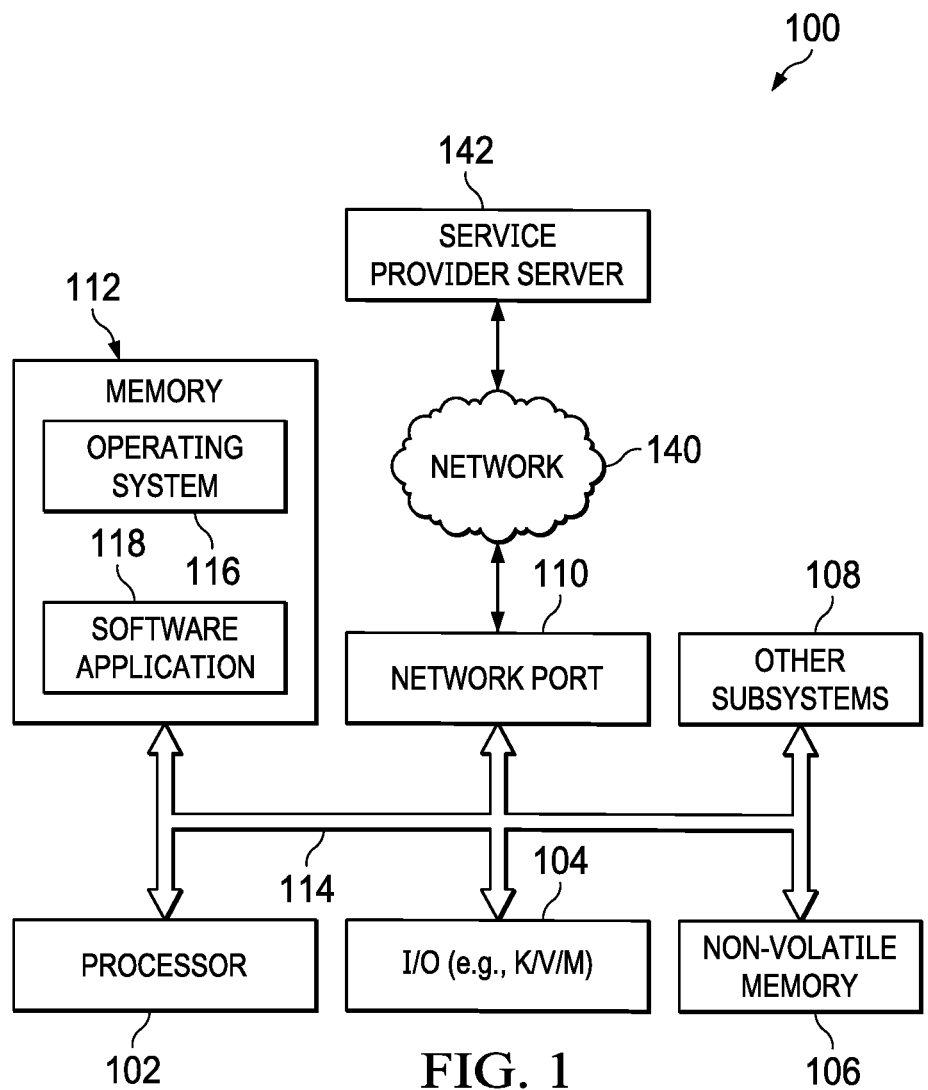
FIG. 1 shows a general illustration of components of an information handling system as implemented in the system and method of the present invention.

Various aspects of the present disclosure include an appreciation that a portable information handling system chassis can be disassembled while cable locks are engaged. Various aspects of the present disclosure include an appreciation that certain known cable locks prevent theft of a portable information handling system, but do not prevent intrusion into the portable information handling system.

Various aspects of the present disclosure include an appreciation that allowing intrusion into a portable information handling system may enable swapping of authentic components with inauthentic ones, may allow unauthorized hardware/firmware/software to access privileged information in the portable information handling system. Various aspects of the present disclosure include an appreciation that allowing intrusion into a portable information handling system may allow data or confidential information exfiltration. For example, brief physical access to the motherboard of the portable information handling system, such as by removing the bottom cover, can allow an attacker to directly steal or copy information from storage and memory such as user data, credentials, or encryption keys.

Accordingly, a portable information handling system locking system is disclosed which addresses these issues. More specially, in certain embodiments, the portable information handling system locking system includes a D-Cover locking component to which a cable lock is attached. In certain embodiments, the D-Cover locking component prevents D-Cover removal when engaged. In certain embodiments, the D-Cover locking component includes a steel plate which is mounted within D-Cover (instead of palmrest/C-cover) thus allowing a lock to thread through both components when engaged. In certain embodiments, the D-Cover locking component prevents prying open of an opposite side of a D-Cover. Such a D-Cover locking component ensures the lock side of the D-Cover must be released first before components mounted within the D-Cover can be accessed. Such a D-Cover locking component provides tamper resistance as well as tamper evidence. With such a D-Cover locking component both the D-Cover and the C-would show evidence of damage if forcefully removed.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
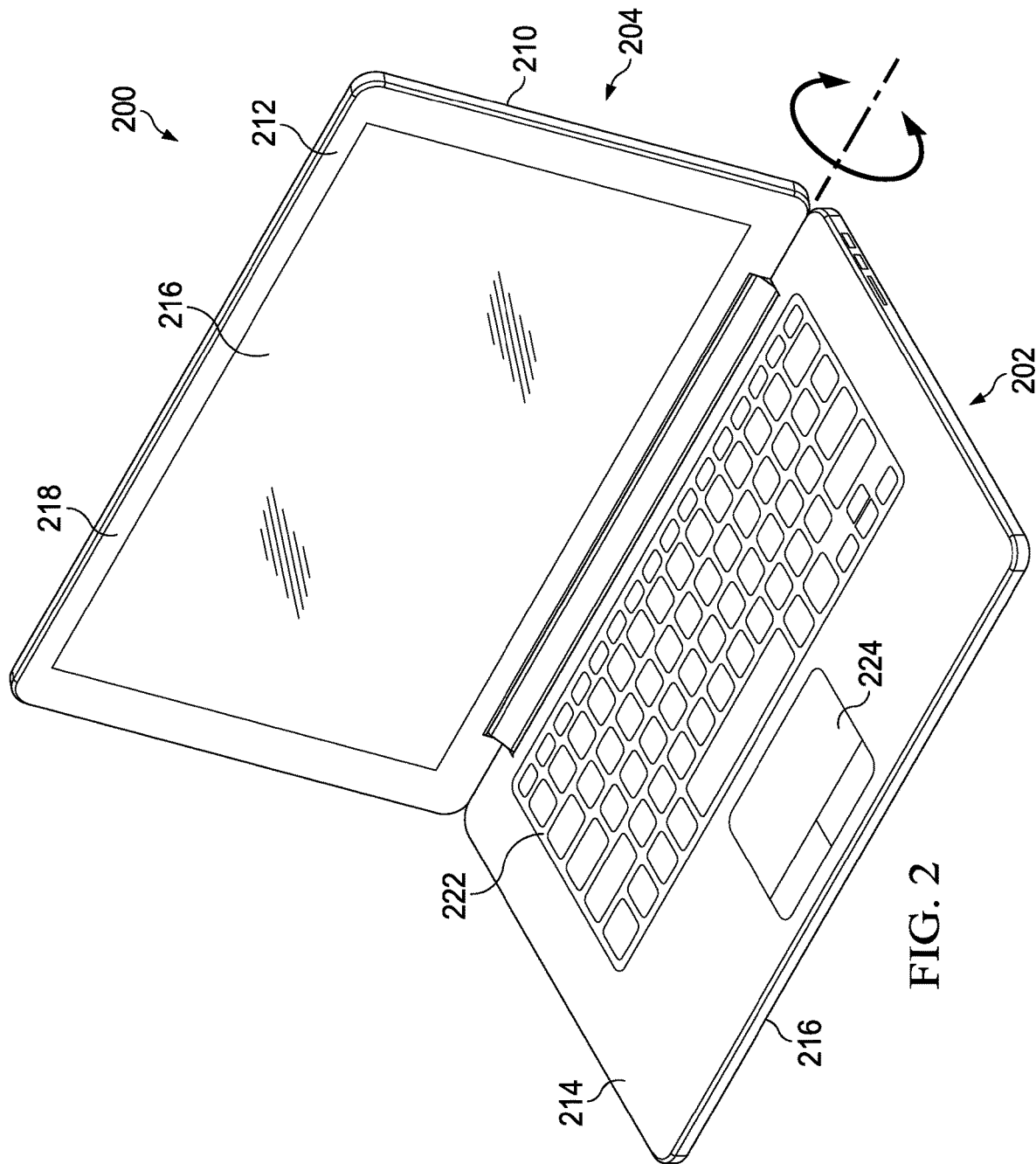
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the display chassis 204 with regard to the base chassis 202, for example up to 180° rotation arc. In other embodiments the information handling system 200 may be a convertible information handling system with full rotation to a tablet configuration.

Figure 3:
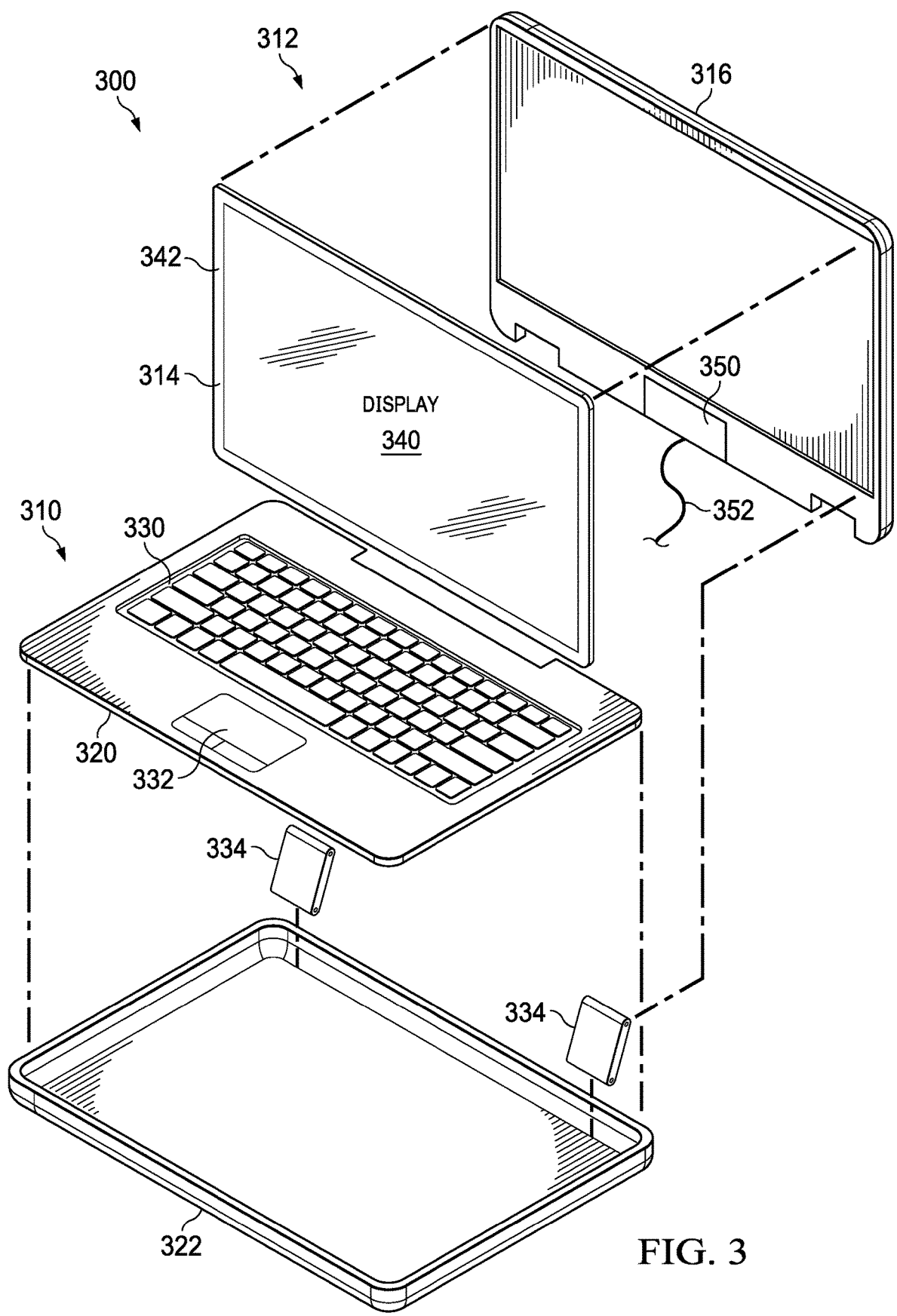
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 212) and a rear display cover portion 316 (which includes the A-Cover 210). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 312 such that bezel may be narrow in size (e. g., less than 10 millimeters) on the edges. For example, display 340 is an infinity display with narrow bezels on the top and sides of lid housing portion 312 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
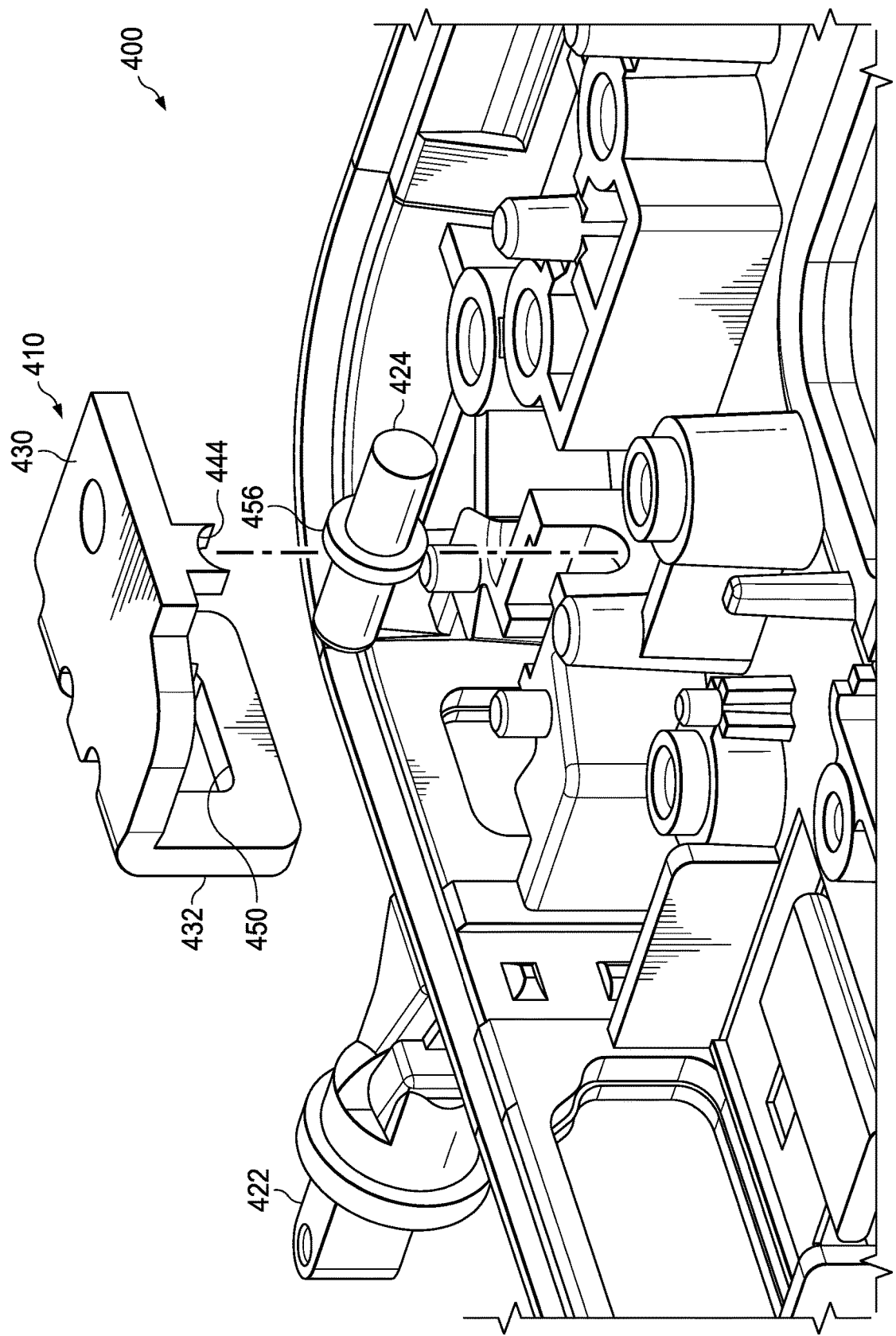
FIG. 4 shows an exploded view of a portion of a base chassis of a portable information handling system which includes an information handling system locking system.
Figure 5:
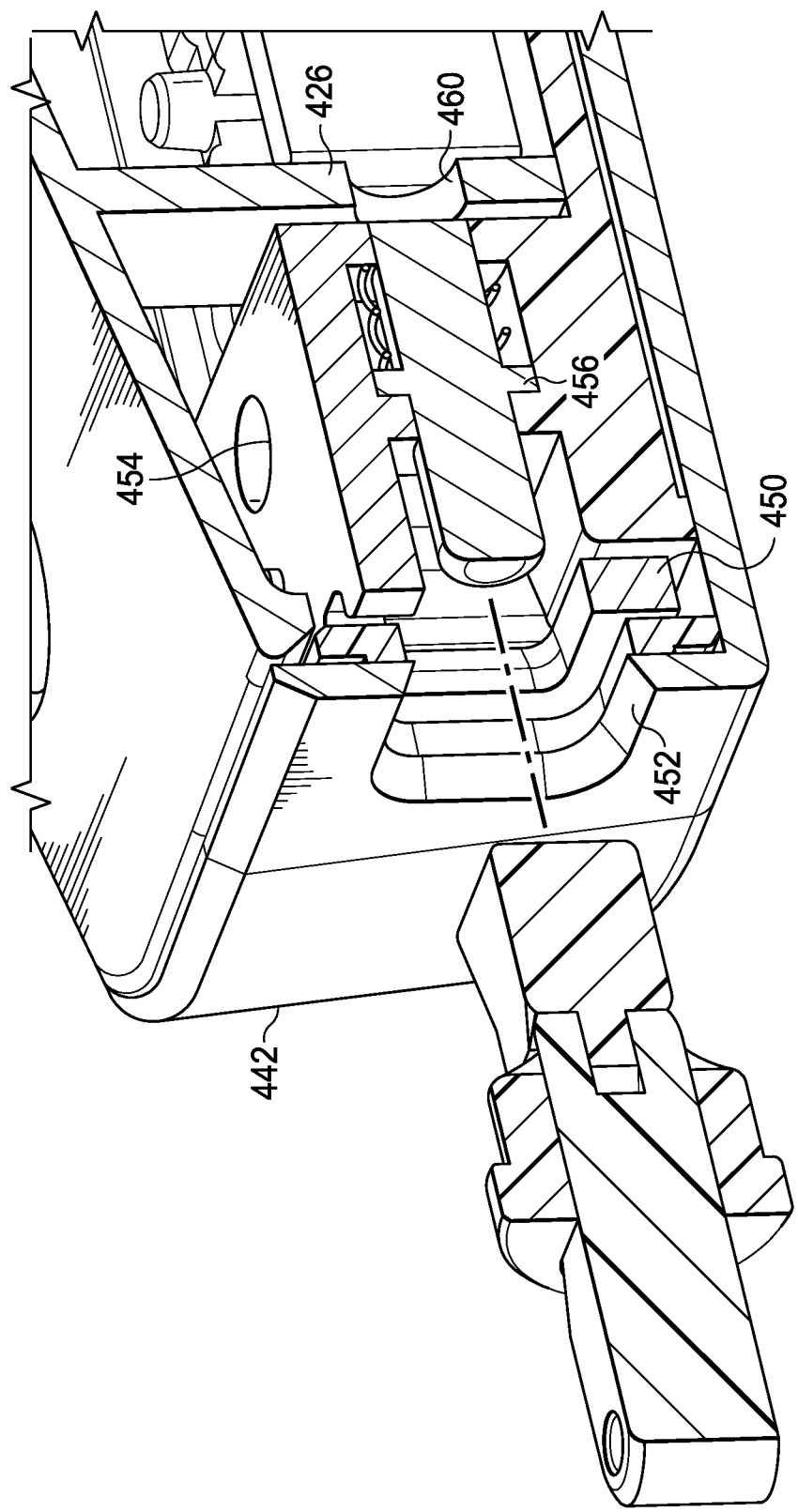
FIG. 5 shows a cut away view of a portion of a base chassis of a portable information handing system which includes an information handling system locking system in an unlocked configuration.
Figure 6:
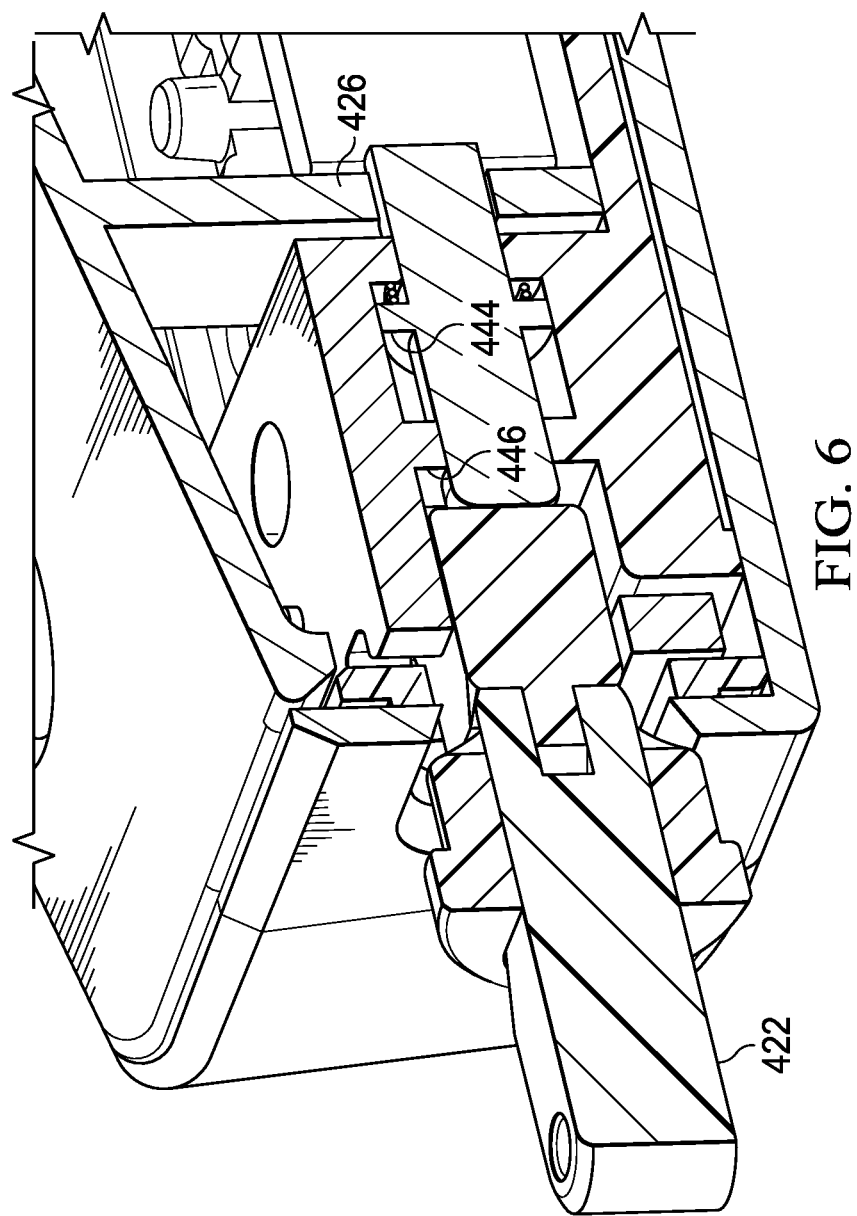
FIG. 6 shows a cut away view of a portion of a base chassis of a portable information handing system which includes an information handling system locking system in a locked configuration.

FIG. 4 shows an exploded view of a portion of a base chassis 400 of a portable information handling system which includes an information handling system locking system 410. FIG. 5 shows a cut away view of a portion of a base chassis of a portable information handing system which includes an information handling system locking system in an unlocked configuration. FIG. 6 shows a cut away view of a portion of a base chassis of a portable information handing system which includes an information handling system locking system in a locked configuration. In various embodiments, the information handling system locking system 410 includes one or more of a D-Cover locking component 420, a cable locking component 422, a pin component 424 and a D-Cover locking element 426. In various embodiments, the D-cover locking component 420 may be referred to as a bottom cover locking component. In various embodiments, the D-cover locking element 426 may be referred to as a bottom cover locking element. In certain embodiments, the cable locking portion 422 is a portion of a cable lock which, when inserted into the information handling system, may be engaged such as by using a key to lock the lock. When the cable locking portion 422 is engaged, the locking portion expands so that it may not be easily removed from the information handling system. When the information handling system locking system is engaged (i.e., locked) the information handling system locking system prevents removal of the information handling system as well as removal of the D-Cover of the information handling system.

In certain embodiments, the D-Cover locking component 420 includes a metal bracket. In certain embodiments, the D-Cover locking component 420 includes a horizontal mounting portion 430 and a vertical portion 432. In certain embodiments, the horizontal mounting portion 430 is mounted to be substantially parallel (e.g., +/−15 degrees) with the bottom 440 of the D-Cover and the vertical portion 420 is substantially parallel (e.g., +/−15 degrees) with a side 442 of the C-Cover. In certain embodiments, the horizontal mounting portion 430 includes a stop portion 444 extending downwardly from the rear of the horizontal mounting portion 430. In certain embodiments, the horizontal mounting portion 430 includes a stop portion 446 extending downwardly from an interior portion of the horizontal mounting portion 430. In certain embodiments, the interior portion of the horizontal mounting portion is positioned between a front portion of the horizontal mounting portion 430 and a rear portion of the horizontal mounting portion. For the purposes of this disclose, the front portion of the horizontal mounting portion is a portion of the locking component located closest to the side 442 of the C-Cover and the rear portion of the locking component is a portion of the locking component located farthest from the side 442 of the C-Cover. In certain embodiments, the stop portion 444 includes a curved portion 446.

In certain embodiments, the vertical portion 420 defines an aperture 450 for reception of a portion of the cable locking component 422. In certain embodiments, the side 442 of the C-cover defines an aperture 452. In certain embodiments, the aperture 450 and the aperture 452 are aligned such that the cable locking component 422 may be inserted into the C-Cover and through the aperture 450 of the vertical portion 420 of the D-cover locking component 420. In certain embodiments, the horizontal mounting portion 430 is mounted to a mounting receptor of the D-Cover. In certain embodiments, the horizontal mounting portion 430 defines an aperture 454 via which a fastener (e.g., a screw) (not shown) fastens the D-Cover locking component 420 to the D-Cover.

In certain embodiments, the pin component 424 is substantially cylindrical. In certain embodiments, the pin component 424 includes a stop portion 456. In certain embodiments, the stop portion 456 controls movement of the pin component 424 between the stop 444 and the stop 446. In certain embodiments, the stop portion 456 extends cylindrically from the pin component 424. In certain embodiments, the stop portion 456 is positioned between a front portion of the pin component 424 and a rear portion of the pin component 424. For the purposes of this disclose, the front portion of the pin component is a portion of the pin component located closest to the side 442 of the C-Cover and the rear portion of the pin component is a portion of the pin component located farthest from the side 442 of the C-Cover.

In certain embodiments, the D-Cover locking element 426 extends from the inside of the D-Cover. In certain embodiments, the D-Cover locking element 426 substantially abuts (e.g., +/-2 mm) a rear edge of the D-Cover locking component 420. In certain embodiments, the D-Cover locking element 426 substantially abuts a rear edge of the horizontal mounting portion 430 of the D-Cover locking portion 420. In certain embodiments, the D-Cover locking element 426 defines a locking aperture 460. In certain embodiments, the D-cover locking element 426 is integrated with the D-Cover. For the purposes of this disclosure, integrated may be defined as being constructed from a single piece of material. In certain embodiments, when the cable locking component 422 is inserted into the D-Cover locking component 420, the pin component 424 slides through the locking aperture 460, thus providing additional strength to locking the D-Cover in addition to locking the C-Cover (by virtue of the cable locking component 422 being inserted through the C-Cover aperture 452). In certain embodiments, the pin component 424 provides a tamper deterrent. Specifically, if there is an unauthorized attempt to remove the D-Cover, the pin component 424 and the D-Cover locking element 426 generate a tamper indication in the D-Cover due to damage to the D-Cover about the D-Cover locking element 426.

In certain embodiments, the information handling system locking system 410 prevents D-Cover removal when engaged. In certain embodiments, the information handling system locking system 410 includes a steel plate which is mounted within D-Cover thus allowing a lock to thread through both the C-Cover and D-Cover when engaged. In certain embodiments, the information handling system locking system 410 prevents prying open of an opposite side of a D-Cover. Such a information handling system locking system 410 ensures the lock side of the D-Cover must be released first before components mounted within the D-Cover can be accessed. Such an information handling system locking system 410 provides tamper resistance as well as tamper evidence. With such an information handling system locking system 410 both the D-Cover and the C-Cover would show evidence of damage if forcefully removed.

Figure 7:
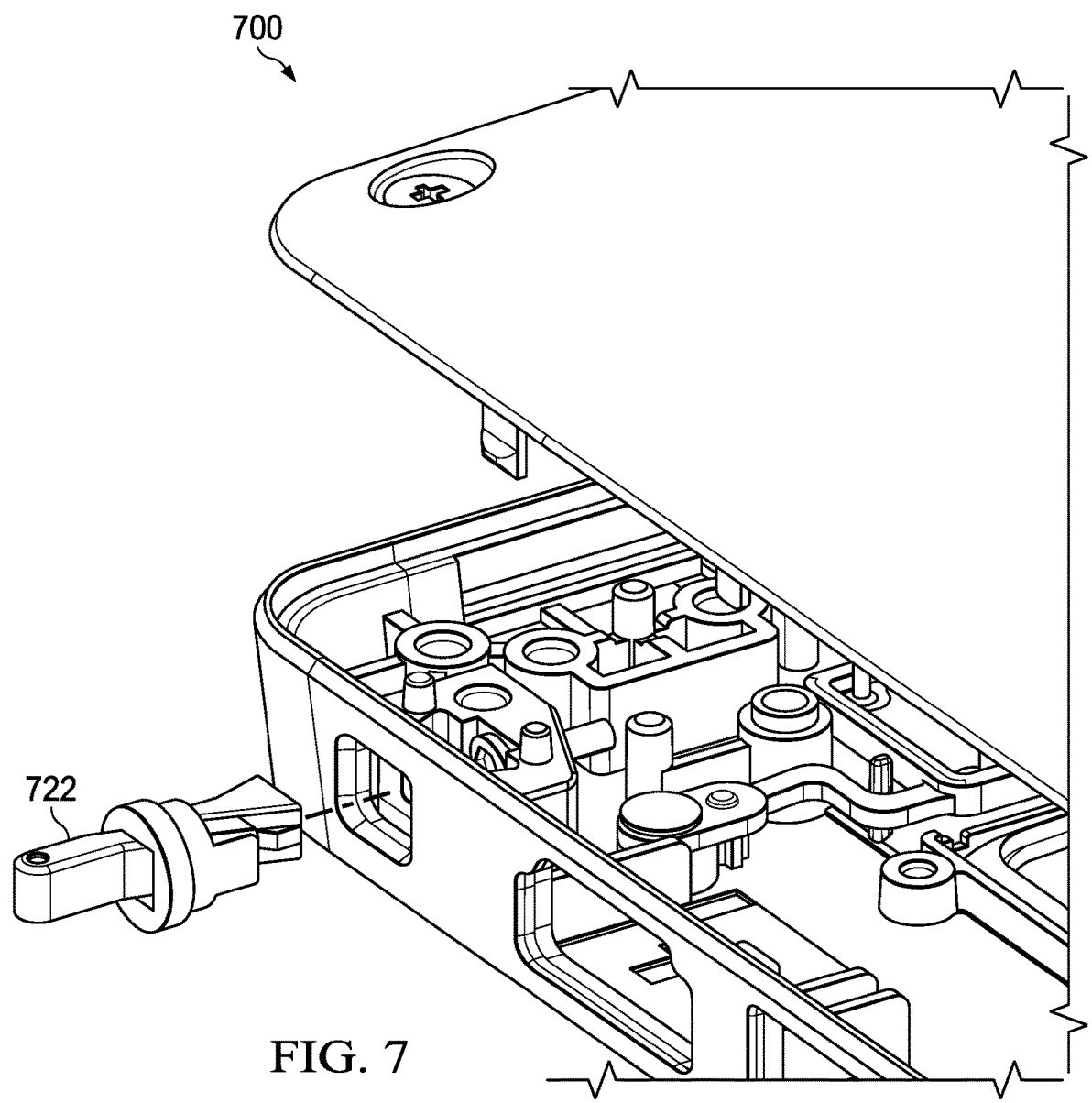
FIG. 7 shows an exploded view of a portion of a base chassis of a portable information handling system which includes an information handling system locking system.
Figure 8:
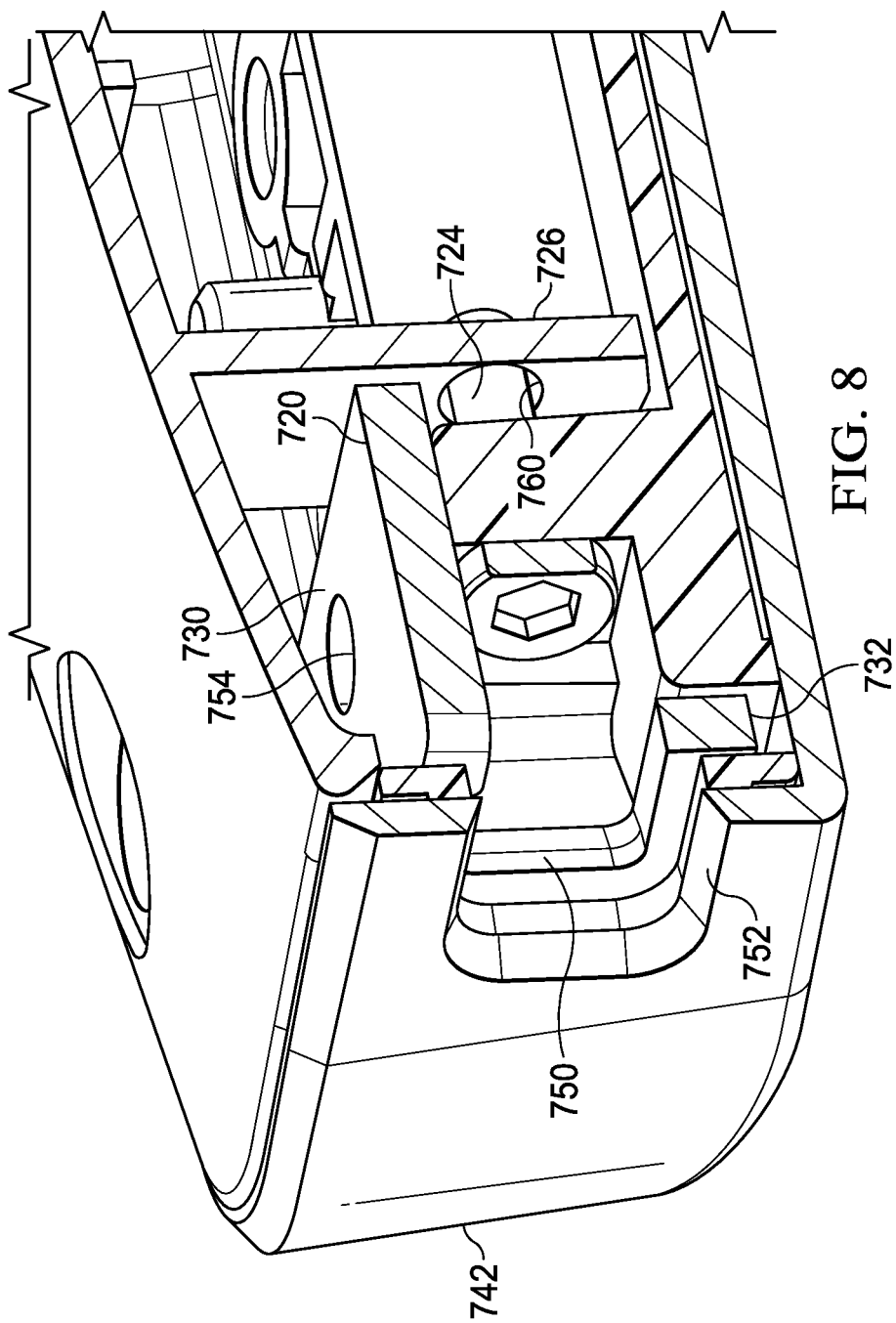
FIG. 8 shows a cut away view of a portion of a base chassis of a portable information handing system which includes an information handling system locking system in an unlocked configuration.
Figure 9:
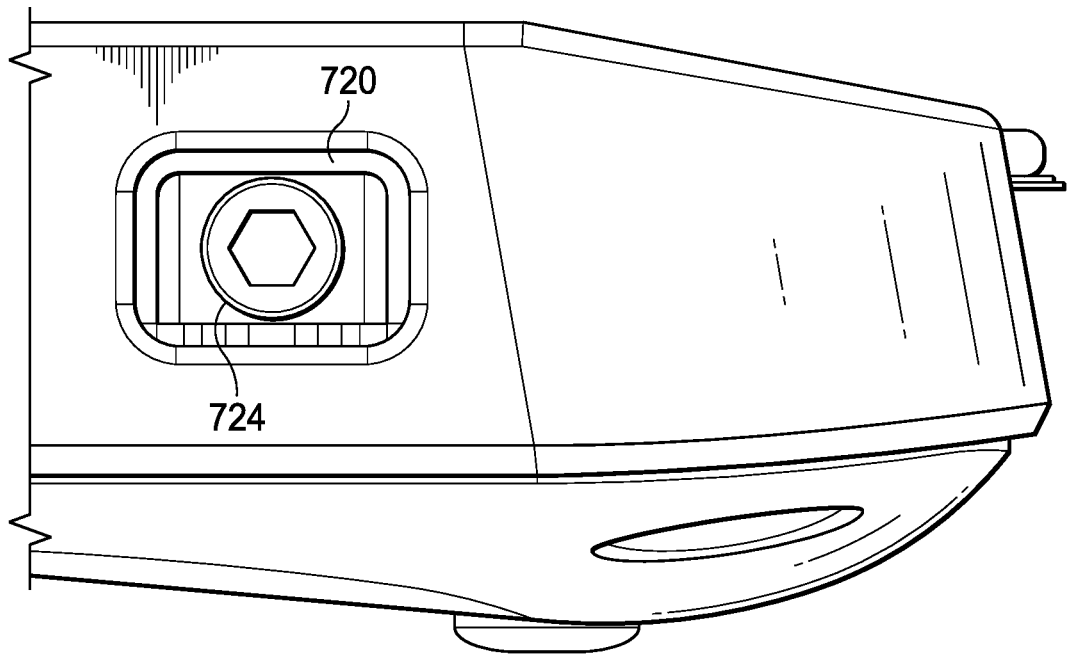
FIG. 9 shows a side view of a portion of a base chassis of a portable information handing system which includes an information handling system locking system in a locked configuration.
Figure 10:
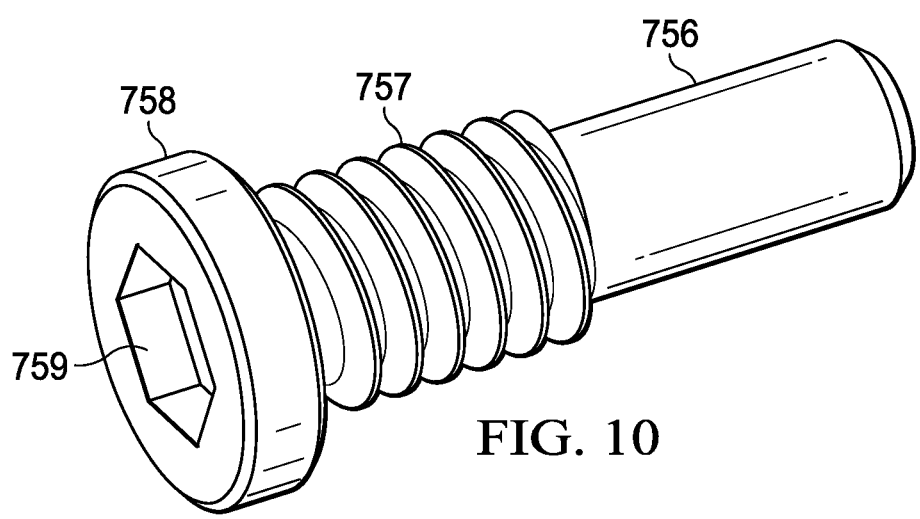
FIG. 10 shows a perspective view of a portable information handling system fasten component.

FIG. 7 shows an exploded view of a portion of a base chassis 700 of a portable information handling system which includes an information handling system locking system 710. FIG. 8 shows a cut away view of a portion of a base chassis of a portable information handing system which includes an information handling system locking system 710 in an unlocked configuration. FIG. 9 shows a side view of a portion of a base chassis of a portable information handing system which includes an information handling system locking system 710 in an unlocked configuration. FIG. 10 shows a perspective view of a portable information handling system fasten component. In various embodiments, the information handling system locking system 710 includes one or more of a D-Cover locking component 720, a cable spring component 722, a fastener component 724 and a D-Cover locking element 726. In various embodiments, the D-cover locking component 720 may be referred to as a bottom cover locking component. In various embodiments, the D-cover locking element 726 may be referred to as a bottom cover locking element. When the information handling system locking system is engaged (i.e., locked) the information handling system locking system prevents removal of the information handling system as well as removal of the D-Cover of the information handling system.

In certain embodiments, the D-Cover locking component 720 includes a metal bracket. In certain embodiments, the D-Cover locking component 720 includes a horizontal mounting portion 730 and a vertical portion 732. In certain embodiments, the horizontal mounting portion 730 is mounted to be substantially parallel (e.g., +/-15 degrees) with the bottom 740 of the D-Cover and the vertical portion 720 is substantially parallel (e.g., +/-15 degrees) with a side 742 of the C-Cover.

In certain embodiments, the vertical portion 720 defines an aperture 750 for reception of a portion of the cable spring component 722. In certain embodiments, the side 742 of the C-cover defines an aperture 752. In certain embodiments, the aperture 750 and the aperture 752 are aligned such that the cable spring component 722 may be inserted into the C-Cover and through the aperture 750 of the vertical portion 720 of the D-cover locking component 720. In certain embodiments, the horizontal mounting portion 730 is mounted to a mounting receptor of the D-Cover. In certain embodiments, the horizontal mounting portion 730 defines an aperture 754 via which a fastener (e.g., a screw) (not shown) fastens the D-Cover locking component 720 to the D-Cover.

In certain embodiments, the fastener component 724 is substantially cylindrical. In certain embodiments, the fastener component 724 includes a lock portion 756, a threaded portion 757 and a head portion 758. In certain embodiments, the head portion 758 extends cylindrically beyond a main body of the fastener component 724. In certain embodiments, the head portion 758 includes a tool indentation 759. In certain embodiments, the tool indentation 759 allows a tool to be mated with the fastener component to facilitate rotation of the fastener component about an axis. In certain embodiments, the axis extends laterally across the center of the fastener component 724. is located. In certain embodiments, the lock portion 756 is positioned between a center portion of the fastener component 724 and a rear portion of the fastener component 724. For the purposes of this disclose, the rear portion of the fastener component is a portion of the fastener component located furthest from the side 742 of the C-Cover and the center portion of the fastener component is a portion of the fastener component located somewhere between the side 742 of the C-Cover and the furthest location from the side 742. In certain embodiments, the threaded portion 757 is positioned between a front portion of the fastener component 724 and a center portion of the fastener component 724. In certain embodiments, the threaded portion 757 mates with a threaded portion of a projection from an inside portion of the C-Cover. For the purposes of this disclosure, the front portion of the fastener component 724 is a portion of the fastener component located closer to the side 742 of the C-Cover and the center portion of the fastener component is a portion of the fastener component located somewhere between the side 742 of the C-Cover and the closer location from the side 742. In certain embodiments, the head portion 758 is positioned closest to the side 742. For the purposes of this disclosure, closest to the side is a portion of the fastener component located closest to the side 742.

In certain embodiments, the D-Cover locking element 726 extends from the inside of the D-Cover. In certain embodiments, the D-Cover locking element 726 substantially abuts (e.g., +/−2 mm) a rear edge of the D-Cover locking component 720. In certain embodiments, the D-Cover locking element 726 substantially abuts a rear edge of the horizontal mounting portion 730 of the D-Cover locking portion 720. In certain embodiments, the D-Cover locking element 726 defines a locking aperture 760. In certain embodiments, the D-cover locking element 726 is integrated with the D-Cover. For the purposes of this disclosure, integrated may be defined as being constructed from a single piece of material. In certain embodiments, the fastener component 724 is inserted into the locking aperture by rotating the fastener component 724 about its axis to cause the threads of the locking component to interact with the threads of the C-Cover. In certain embodiments, inserting the fastener component into the locking aperture provides additional strength to locking the D-Cover in addition to locking the C-Cover (by virtue of the cable spring component 722 being inserted through the C-Cover aperture 752). In certain embodiments, the locking component 724 provides a tamper deterrent. If there is an unauthorized attempt to remove the D-Cover, the locking component 424 and the D-Cover locking element 426 generate a tamper indication in the D-Cover due to damage to the D-Cover about the D-Cover locking element 426.

In certain embodiments, the information handling system locking system 710 prevents D-Cover removal when engaged. In certain embodiments, the information handling system locking system 710 includes a steel plate which is mounted within the D-Cover thus allowing a lock to thread through both the C-Cover and D-Cover when engaged. In certain embodiments, the information handling system locking system 710 prevents prying open of an opposite side of a D-Cover. Such an information handling system locking system 710 ensures the lock side of the D-Cover must be released first before components mounted within the D-Cover can be accessed. Such an information handling system locking system 710 provides tamper resistance as well as tamper evidence. With such an information handling system locking system 710 both the D-Cover and the C-Cover would show evidence of damage if forcefully removed.

Figure 11:
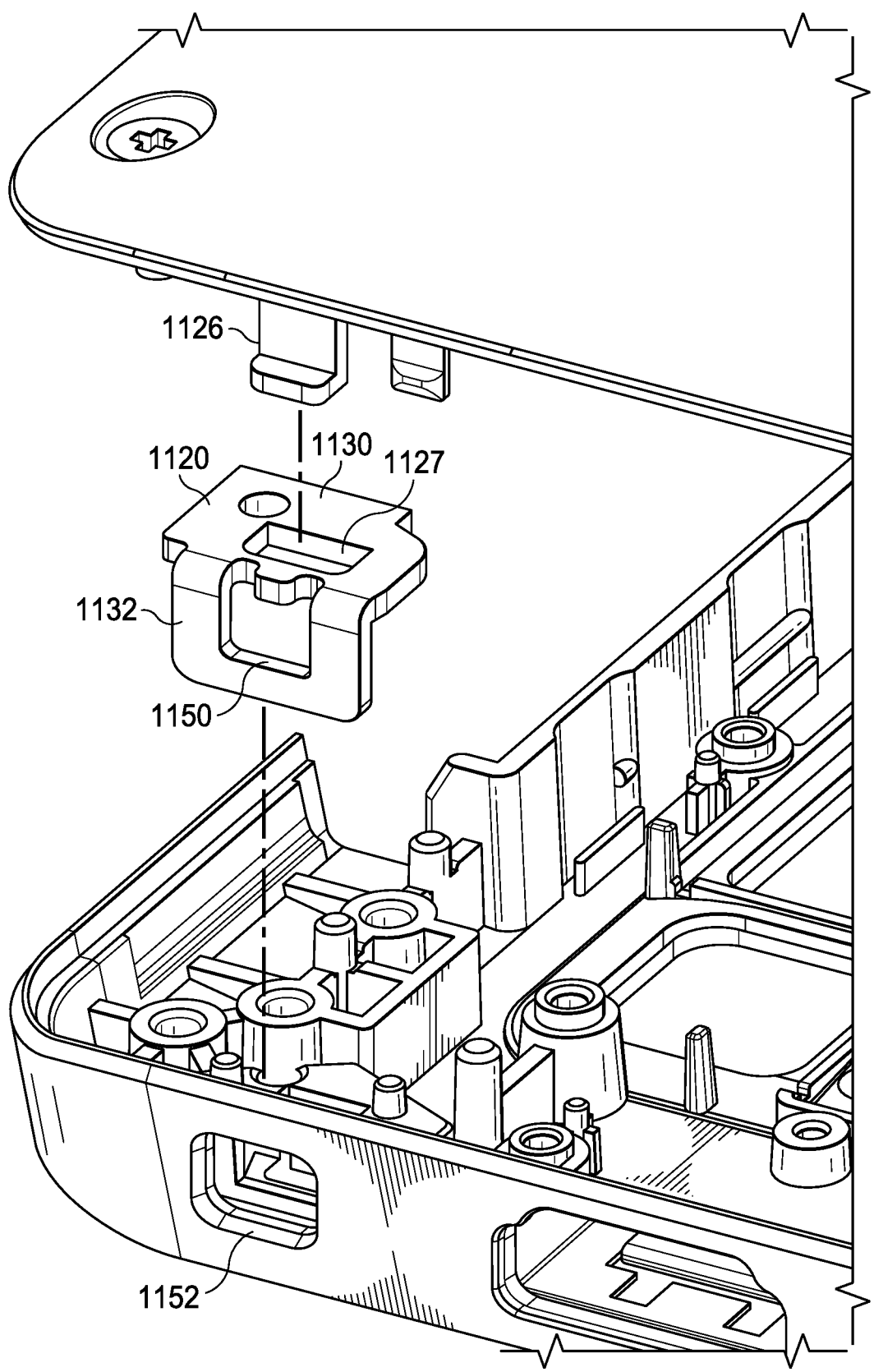
FIG. 11 shows an exploded view of a portion of a base chassis of a portable information handling system which includes an information handling system locking system.
Figure 12:
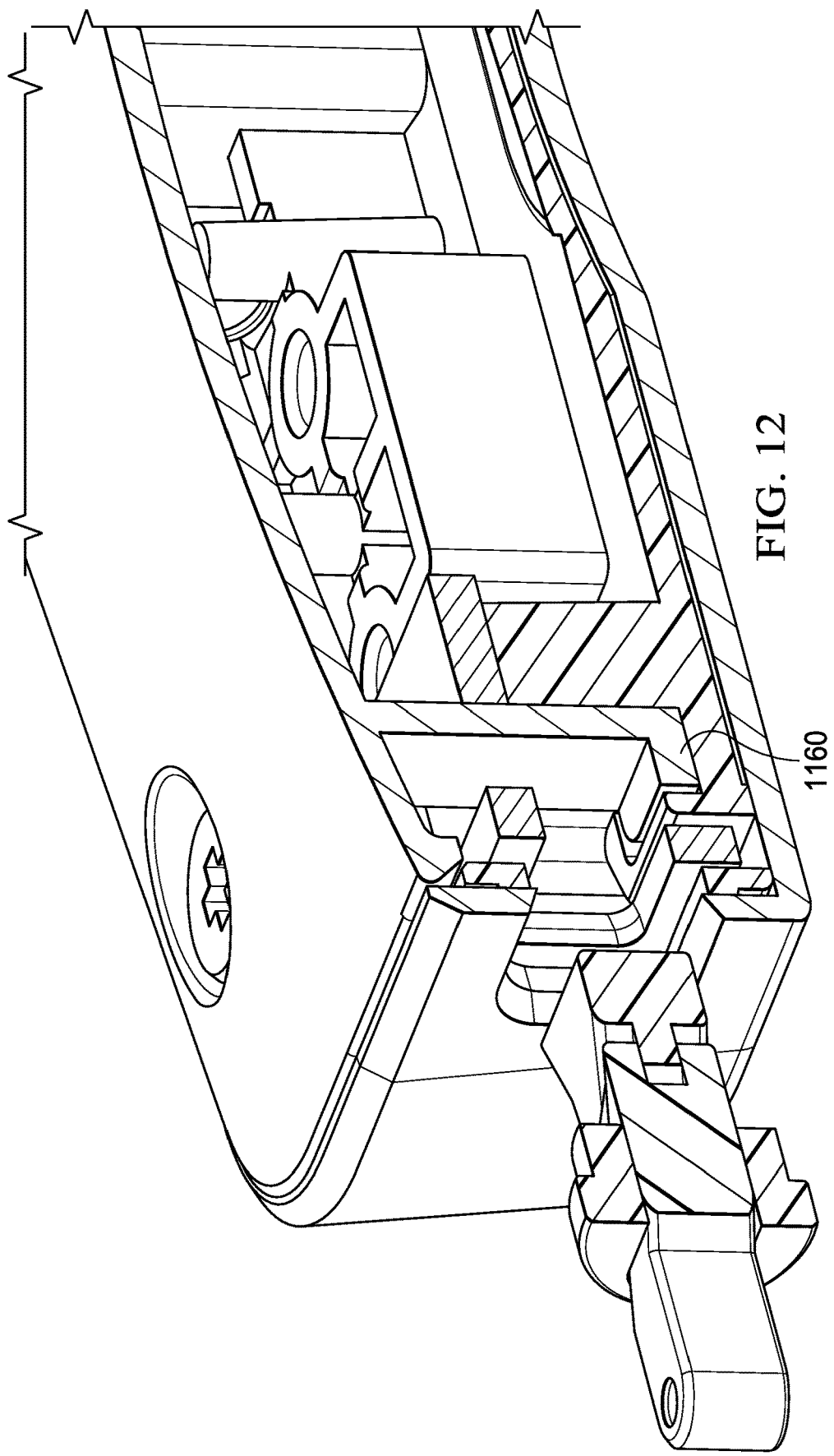
FIG. 12 shows a cut away view of a portion of a base chassis of a portable information handing system which includes an information handling system locking system in an unlocked configuration.
Figure 13:
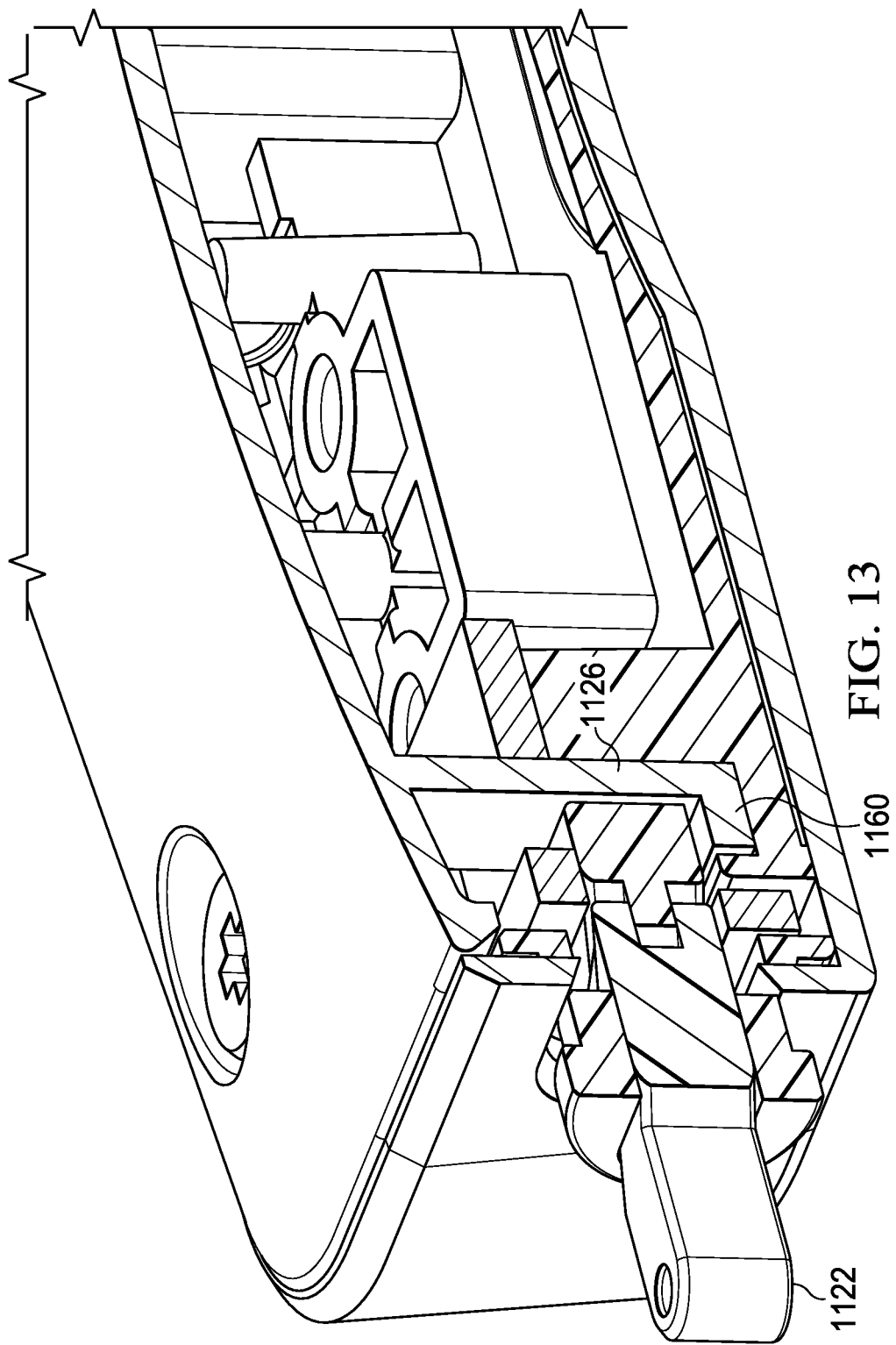
FIG. 13 shows a cut away view of a portion of a base chassis of a portable information handing system which includes an information handling system locking system in a locked configuration.
Figure 14:
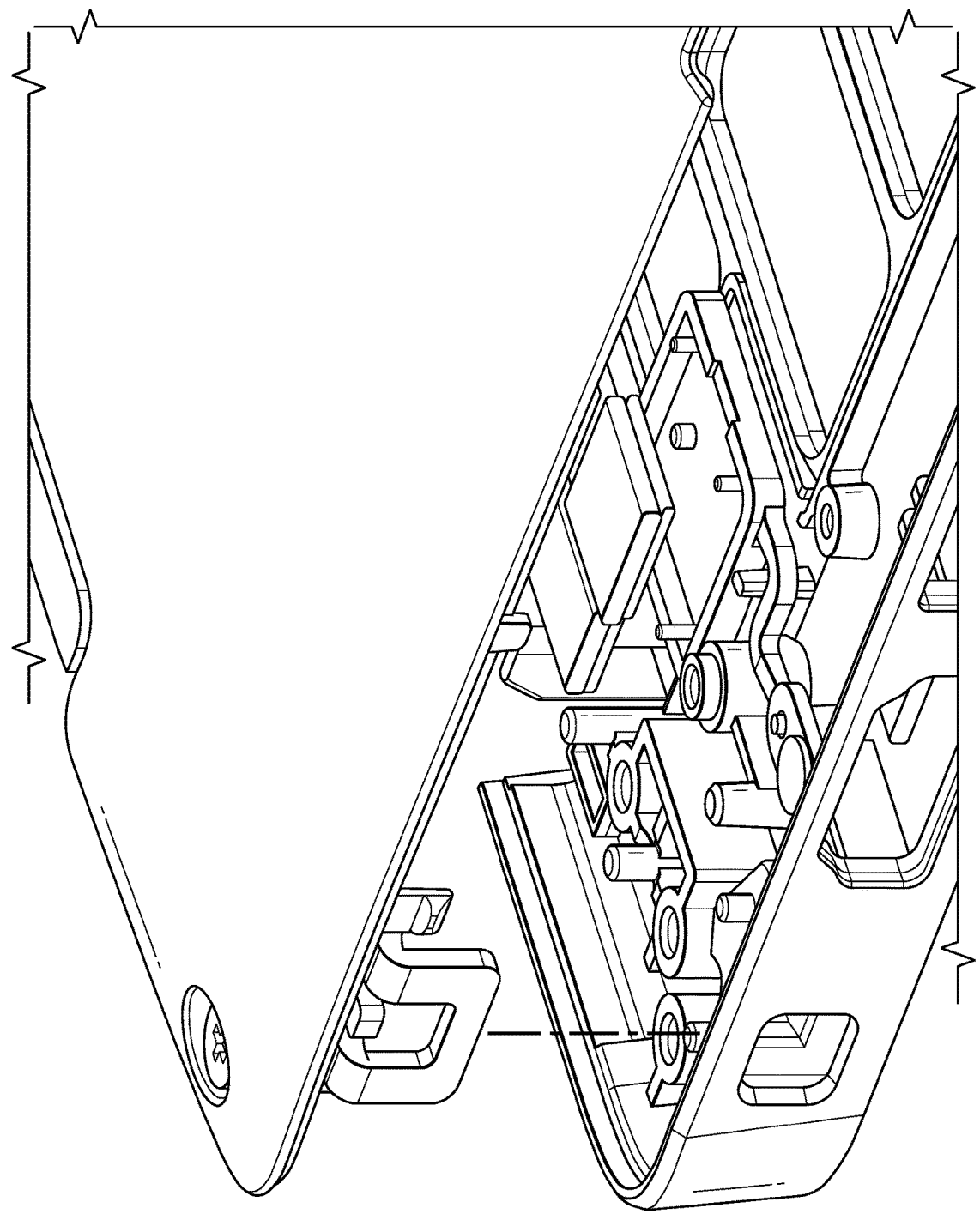
FIG. 14 shows an exploded view from a bottom perspective of a portion of a base chassis of a portable information handling system which includes an information handling system locking system.
Figure 15:
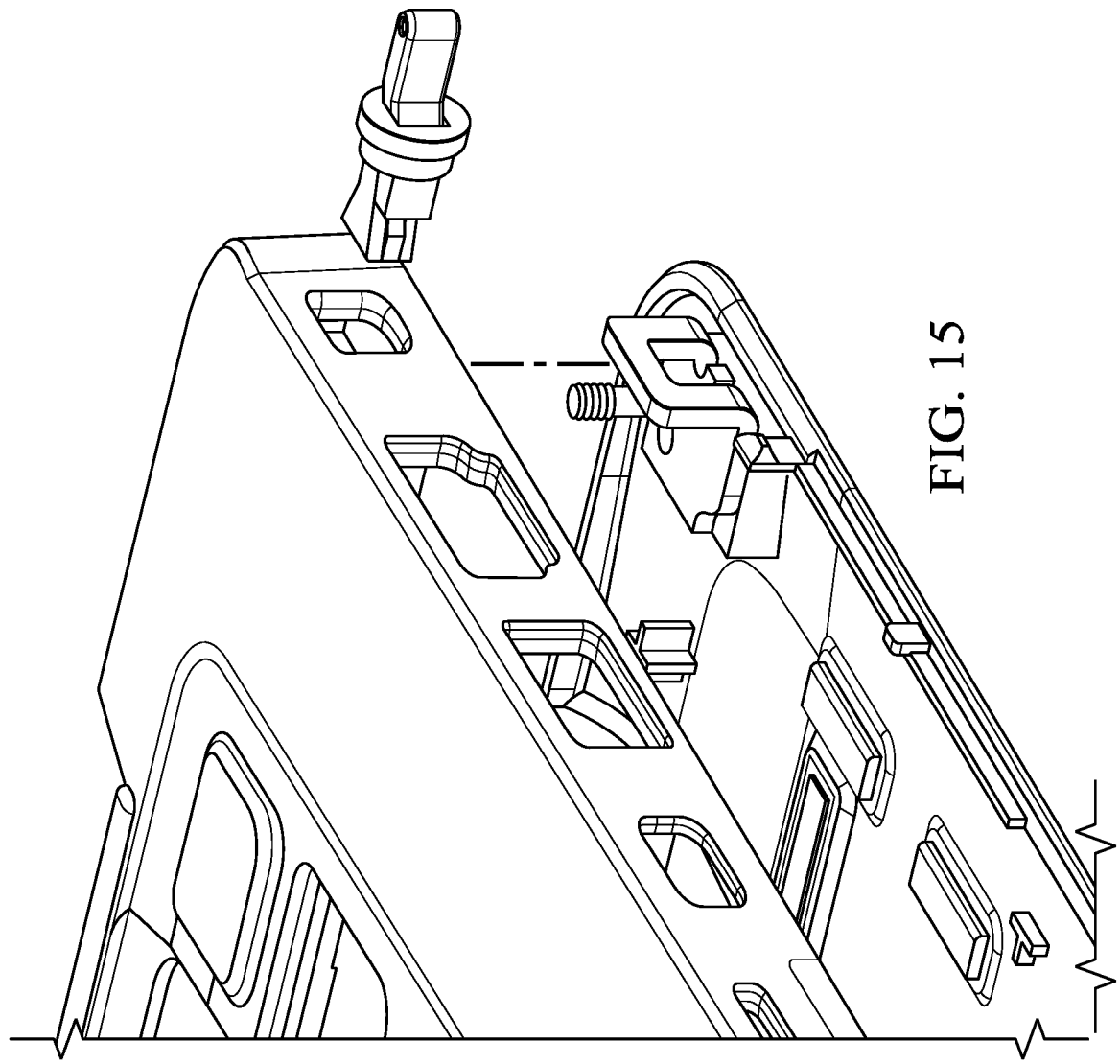
FIG. 15 shows an exploded view from a top perspective of a portion of a base chassis of a portable information handling system which includes an information handling system locking system.

FIG. 11 shows an exploded view of a portion of a base chassis of a portable information handling system which includes an information handling system locking system. FIG. 12 shows a cut away view of a portion of a base chassis of a portable information handing system which includes an information handling system locking system in an unlocked configuration. FIG. 13 shows a cut away view of a portion of a base chassis of a portable information handing system which includes an information handling system locking system in a locked configuration. FIG. 14 shows an exploded view from a bottom perspective of a portion of a base chassis of a portable information handling system which includes an information handling system locking system. FIG. 15 shows an exploded view from a top perspective of a portion of a base chassis of a portable information handling system which includes an information handling system locking system. In various embodiments, the information handling system locking system 1110 includes one or more of a D-Cover locking component 1120, a cable spring component 1122 and a D-Cover locking element 1126. In various embodiments, the D-cover locking component 1120 may be referred to as a bottom cover locking component. In various embodiments, the D-cover locking element 1126 may be referred to as a bottom cover locking element. When the information handling system locking system is engaged (i.e., locked) the information handling system locking system prevents removal of the information handling system as well as removal of the D-Cover of the information handling system.

In certain embodiments, the D-Cover locking component 1120 includes a metal bracket. In certain embodiments, the D-Cover locking component 1120 includes a horizontal mounting portion 1130 and a vertical portion 1132. In certain embodiments, the horizontal mounting portion 1130 is mounted to be substantially parallel (e.g., +/−15 degrees) with the bottom 1140 of the D-Cover and the vertical portion 1120 is substantially parallel (e.g., +/−15 degrees) with a side 1142 of the C-Cover.

In certain embodiments, the vertical portion 1120 defines an aperture 1150 for reception of a portion of the cable spring component 1122. In certain embodiments, the side 1142 of the C-cover defines an aperture 1152. In certain embodiments, the aperture 1150 and the aperture 1152 are aligned such that the cable spring component 1122 may be inserted into the C-Cover and through the aperture 1150 of the vertical portion 1120 of the D-cover locking component 1120. In certain embodiments, the horizontal mounting portion 1130 is mounted to a mounting receptor of the D-Cover. In certain embodiments, the horizontal mounting portion 1130 defines an aperture 1152 via which a fastener (e.g., a screw) (not shown) fastens the D-Cover locking component 1120 to the D-Cover.

In certain embodiments, the D-Cover locking element 1126 extends from the inside of the D-Cover. In certain embodiments, the D-Cover locking element 1126 substantially abuts (e.g., +/−2 mm) a rear edge of the D-Cover locking component 1120. In certain embodiments, the D-Cover locking element 1126 fits within an aperture 1127 defined by the horizontal mounting portion 1130 of the D-Cover locking portion 1120. In certain embodiments, the D-Cover locking element 1126 includes a locking projection 1160. In certain embodiments, the D-cover locking element 1126 is integrated with the D-Cover. For the purposes of this disclosure, integrated may be defined as being constructed from a single piece of material. In certain embodiments, the D-Cover locking element 1126 provides tamper deterrence. Specifically, if there is an unauthorized attempt to remove the D-Cover, the D-Cover locking element 1126 generates a tamper indication in the D-Cover due to damage to the D-Cover about the D-Cover locking element 1126.

In certain embodiments, the information handling system locking system 1110 prevents D-Cover removal when engaged. In certain embodiments, the information handling system locking system 1110 includes a steel plate which is mounted within the D-Cover thus allowing a lock to thread through both the C-Cover and D-Cover when engaged. In certain embodiments, the information handling system locking system 1110 prevents prying open of an opposite side of a D-Cover. Such an information handling system locking system 1110 ensures the lock side of the D-Cover must be released first before components mounted within the D-Cover can be accessed. Such an information handling system locking system 1110 provides tamper resistance as well as tamper evidence. With such an information handling system locking system 1110 both the D-Cover and the C-Cover would show evidence of damage if forcefully removed.

Figure 16A:
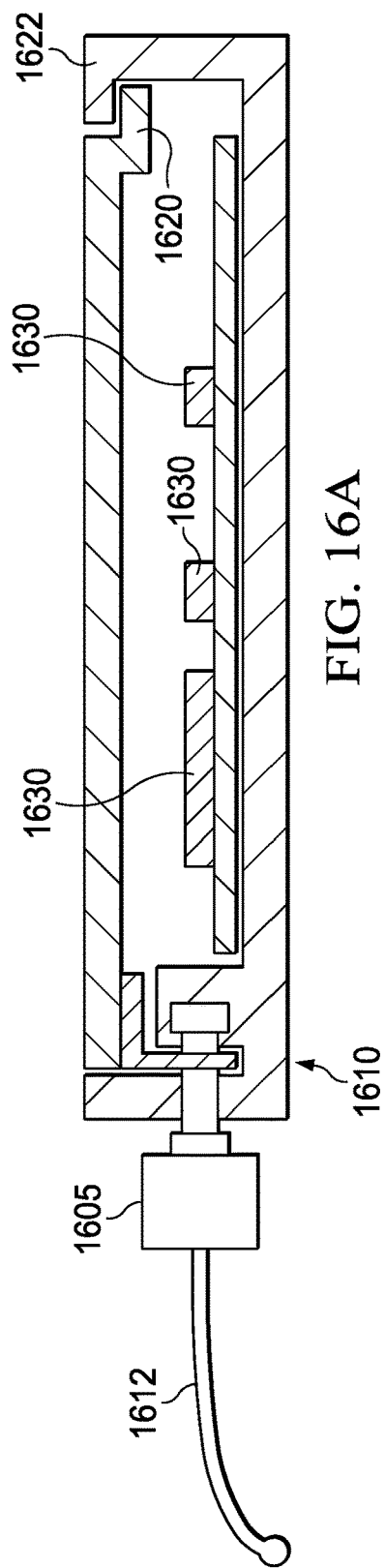
FIGS. 16A and 16B show block diagram representations of a panel disengagement sequence.
Figure 16B:
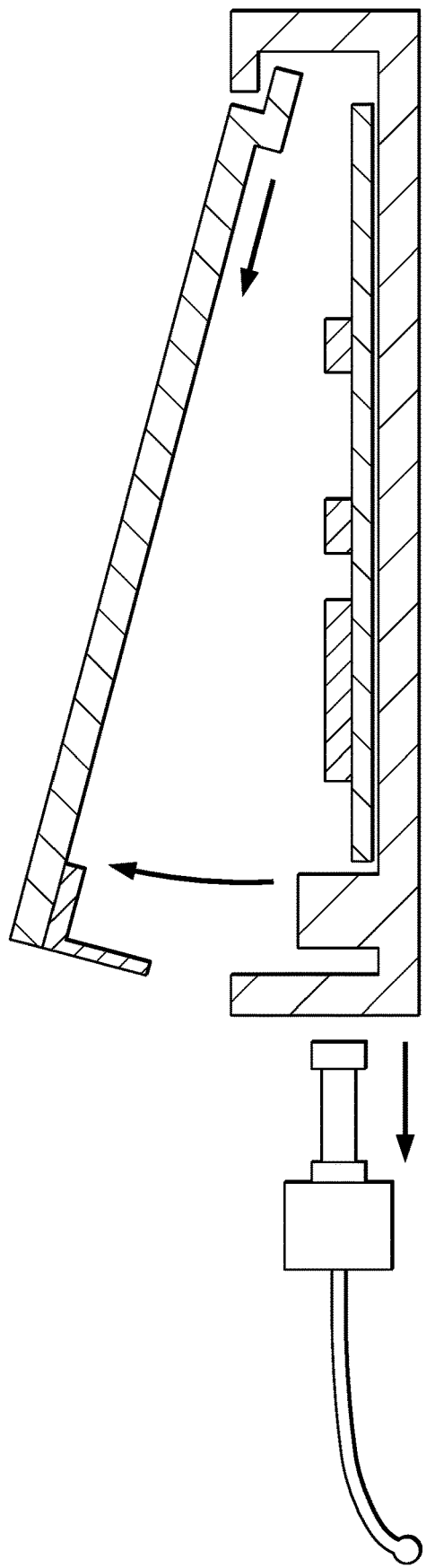

FIGS. 16A and 16B show block diagram representations of a panel disengagement sequence. Specifically, when a lock 1605 is engaged with the locking system 1610, the lock is threaded through an aperture defined by the C-Cover into the locking system 1610. In certain embodiments, a cable 1612 associated with the lock 1605 is attached to some type of fixed object (not shown). In certain embodiments, the D-Cover includes a tab 1620 which is inserted into an edge 1622 of the C-Cover. In certain embodiments. the tab 1620 and the edge 1622 prevent an opposite side of the D-Cover (i.e., a side of the D-Cover opposite the locking system 1610) from being pried open when the locking system 1610 is engaged.

In certain embodiments, the D-Cover functions as a service panel, which can be removed to provide access to components 1630 (such as components mounted on a motherboard of the information handling system). In certain embodiments, authorized access to the components is only available when the locking system 1610 is not engaged. More specifically, when the lock 1605 is removed, the D-Cover (along with the attached locking component 1640) may be tilted away from the C-Cover. Once the D-Cover is tilted away from the C-Cover, the D-Cover may be slid away from the C-Cover, thus providing authorized access to the components 1630. In certain embodiments, unauthorized access would provide a tamper indication on one or more of the C-Cover and the D-Cover.

Figure 17A:
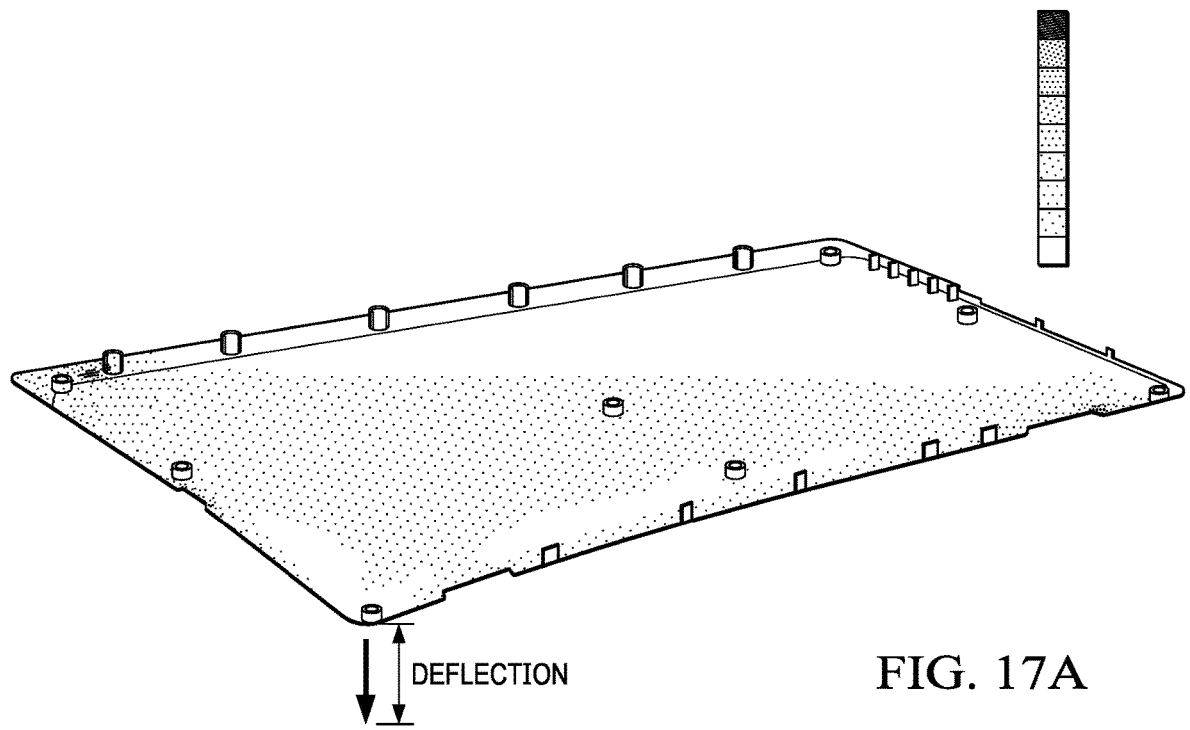
FIGS. 17A and 17B show examples of base chassis tamper evidence.
Figure 17B:
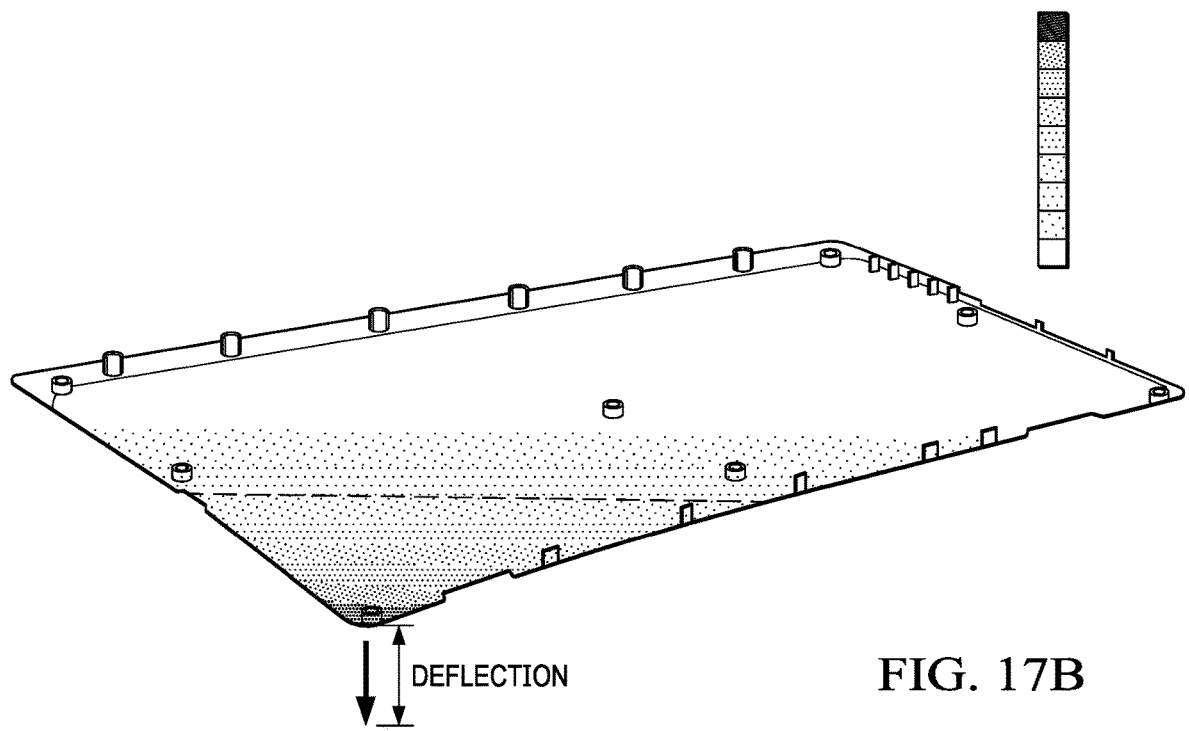

FIGS. 17A and 17B show examples of base chassis tamper evidence. Specifically, when there is an unauthorized attempt to access components within the information handling system, the D-Cover presents a crease which indicates the unauthorized attempt to access the components. In certain embodiments, the crease is generated as a result of pressure being applied to the D-Cover as a result of the locking mechanism (e.g., locking mechanism 410, 710, 1110) attempting to keep the D-Cover attached to the C-Cover.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A main housing portion of a portable information handing system, comprising:
   a top cover portion, the top cover portion defining a top cover aperture;
   a bottom cover portion; and,
   an information handling system locking system, the information handling system locking system including
      a bottom cover locking component, the bottom cover locking component being mounted to the bottom cover, the bottom cover locking component defining a bottom cover locking portion aperture, the bottom cover locking portion aperture being aligned with the top cover aperture; and,
      a tamper indicator, the tamper indicator including a bottom cover locking element, the bottom cover locking element being physically coupled with the top cover portion when the information handling system locking system is engaged; and wherein
   the bottom cover locking element defines an aperture; and,
   tamper indicator comprises at least one of a locking pin component and a locking fastener, the at least one of the locking pin and the locking fastener being positioned within the aperture when the information handling system locking system is engaged.

2. The main housing portion of claim 1, wherein:
   the tamper indicator provides a tamper indication when there is an unauthorized attempt to remove the bottom cover.

3. The main housing portion of claim 2, wherein:
   the tamper indication presents a crease on the bottom cover indicating the unauthorized attempt to remove the bottom cover.

4. An information handling system comprising:
   a processor;
   a data bus coupled to the processor; and
   an information handling system chassis housing, the housing comprising
   a base chassis, the base chassis housing the processor, the base chassis comprising a top cover portion, the top cover portion defining a top cover aperture;
      a bottom cover portion; and,
      an information handling system locking system, the information handling system locking system including
         a bottom cover locking component, the bottom cover locking component being mounted to the bottom cover, the bottom cover locking component defining a bottom cover locking portion aperture, the bottom cover locking portion aperture being aligned with the top cover aperture; and, a tamper indicator, the tamper indicator including a bottom cover locking element, the bottom cover locking element being physically coupled with the top cover portion when the information handling system locking system is engaged; and wherein the bottom cover locking element defines an aperture; and, tamper indicator comprises at least one of a locking pin component and a locking fastener, the at least one of the locking pin and the locking fastener being positioned within the aperture when the information handling system locking system is engaged.

5. The information handling system of claim 4, wherein:
the tamper indicator provides a tamper indication when there is an unauthorized attempt to remove the bottom cover.

6. The information handling system of claim 5, wherein:
the tamper indication presents a crease on the bottom cover indicating the unauthorized attempt to remove the bottom cover.

* * * * *